Patented Feb. 26, 1963

3,079,221
PROCESS FOR CORROSION INHIBITION
Donald L. Andersen, Minneapolis, Minn., assignor to General Mills, Inc., a corporation of Delaware
No Drawing. Filed Dec. 21, 1959, Ser. No. 860,631
2 Claims. (Cl. 21—2.7)

This invention relates to a new and useful method for protecting metallic substances from corrosive action when in contact with an aqueous medium. More specifically, it relates to the use of quaternary ammonium compounds prepared from polymeric fat acid amines as corrosion inhibitors.

Corrosion of metallic substances represents a major industrial problem. Every year the loss to industry through corrosion amounts to millions of dollars. Ferrous metals are generally associated with this problem; however, copper, brass and aluminum are also affected to a lesser degree. In general, corrosion takes place when the metallic substance comes in contact with a watery media, i.e. water vapor, water, water and oil emulsions, solutions, and so forth.

It has now been discovered that quaternary ammonium compounds prepared from polymeric fat acid amines are exceptionally good corrosion inhibitors and are especially useful against ferrous metals in the presence of oil and aqueous phases. As such, they may be utilized as corrosion inhibitors in the chemical process industries, oil refining and processing equipment, and in the protection of pipelines. Other illustrative applications are additives for protective coatings, industrial water treatment, and as a mineral acid inhibition additive.

Polymeric fat acids are well-known commercially available acids and the polymeric fat amines used in this invention for the preparation of quaternary compounds have essentially the same structure except that the carboxyl functionalities have been replaced by amine functionalities. As such they may be prepared directly from polymeric fat acids by reacting these acids with ammonia to produce the corresponding nitrile and subsequently hydrogenating the nitrile to the corresponding amine. Likewise, it is possible to prepare similar polymeric fat amines by the polymerization of suitable fatty amines, by the polymerization of suitable fatty nitriles followed by hydrogenation of the polymeric fat nitrile to the polymeric fat amine, and by the polymerization of suitable fatty amides to polymeric fatty amides, reaction of the polymeric fatty amide with ammonia to get the corresponding polymeric fat nitriles, and hydrogenation of the polymeric fat nitrile to the corresponding polymeric fat amine.

In any case the basic raw materials for the preparation of the polymeric fat amines are fatty acids having sufficient double bond functionality to form the polymeric material. An ideal starting material would be pure linoleic acid. It will be appreciated, however, that the acids employed occur in nature as complex mixtures and isolation of pure linoleic acid is, as a practical matter, commercially unfeasible. Instead sources rich in linoleic acid (30 to 80%) are employed as the starting acids. One analytical method for describing mixtures of fatty acids having sufficient double bond functionality is by reference to its iodine number, i.e. the number of grams of iodine equivalent to the halogen absorbed by a 100-gram sample. Generally speaking, acids having an iodine number of at least 120 will have sufficient double bond functionality to form the desired polymer. Illustrative sources of suitable acids are soybean, linseed, tung, perilla, cottonseed, corn, sunflower, safflower, and dehydrated castor oil as well as tall oil and soapstock. Furthermore, linoleic acid rich fatty acids may be obtained from these various sources by crystallization and/or distillation.

The polymeric fat amines employed in this invention contain a preponderance of dimer amine in admixture with some trimers and higher polymers as well as some monomeric amine.

Polymeric fat acid amines prepared as shown above may be quaternized with various quaternary salt-forming substances to form the compounds of this invention. These quaternary salt-forming compounds include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl, n-amyl bromide, n-hexyl chloride, benzyl chloride, benzyl bromide, methyl sulfate, ethyl sulfate, methyl benzenesulfonate, methyl p-toluenesulfonate, etc., which will react directly with the polymeric fat acid amines described above to give respectively the methochloride, methobromide, methiodide, ethochloride, ethobromide, ethiodide, n-propochloride, n-propobromide, n-propiodide, isopropobromide, n-butcchloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc., as the quaternary compounds. The preferred groups on the nitrogen atoms are aliphatic hydrocarbon groups of 1–6 carbon atoms.

The quaternization reaction is preferably carried out in the presence of a solvent such as an alcohol in which the polymeric fat acid amine is soluble. Isopropyl and butyl alcohols are preferred solvents. Numerous other solvents are, however, useful as are combinations of solvents such as alcohol-hydrocarbon mixtures. In general, the solvent does not appear to influence the reaction markedly, and is desirable only to effect a more intimate contact between the alkylating agent and the amine.

The reaction may be carried out in the presence of a base, such as the alkali metal hydroxides, alkaline earth hydroxides, alkali metal carbonates, alkali metal alkoxides and the like. These serve to take up any acid liberated in the quaternization reaction. If such a base is not used, the amine groups of the amine serve as acceptors for the acid produced by the reaction. For example, if no base is used and an alkyl halide is employed for quaternization, the acidic material will be a hydrohalide which reacts with the amine groups present to form a salt. In this case, the quaternization is only partial, since some of the amine groups serve as acceptors for the byproducts of the reaction. This is a means of controlling the degree of quaternization in the event that less than complete quaternization is desired.

The quaternary ammonium compounds thus prepared from the polymeric fat acid amines may be represented by the formula $$R[CH_2N^+(R')_3X^-]_n$$

in which R is the hydrocarbon radical of the polymeric fat acid $R[COOH]_n$ obtained by the polymerization of an unsaturated higher fatty acid; R' is an aliphatic group containing 1–6 carbon atoms; X is a salt forming group and $n$ is 2–3.

The process of the present invention is further illustrated by reference to the following example in which all "parts" are expressed as parts by weight.

*Example*

Two-hundred parts of polymeric fat acid amines prepared by reacting polymeric fat acids containing a preponderance of dilinoleic acid with ammonia at 280–400° C. and then hydrogenating the thus formed nitrile in the presence of a Raney nickel catalyst under hydrogen pressure at a moderate temperature (50–170° C.), was charged into an autoclave containing 107 parts of a 57% sodium hydroxide solution and 190 parts of isopropanol.

The autoclave was sealed, agitation started, and methyl chloride added so as to keep the pressure in the range of 80–120 p.s.i. with the temperature being in the range of 105–130° C. At the end of 1⅔ hours the pressure remained constant without the addition of more methyl chloride. At this time the vessel was cooled to 75–80° C. and the gases vented. The reaction mixture was filtered to remove NaCl formed during the reaction and the precipitate washed with 50 cc. of isopropanol. The filtrate and the 50 cc. of wash isopropanol were combined to yield a clear liquid containing approximately 50% of the resulting polymeric fat acid amine quaternary compound in which each of the nitrogen atoms had three methyl substituents.

The above-described quaternary ammonium compound was tested quantitatively as a corrosion inhibitor in a static system. In this test #1020 mild steel coupons were immersed in static sour brine kerosene systems for 7 days and the loss of weight determined.

Comparison to the control system and coupon indicated that the addition of 75 parts per million (p.p.m.) of the above-described quaternary ammonium compound resulted in an 88% average inhibition of weight loss due to rust.

The embodiments of the invention in which an exclusive property or privilege is claimed are defined as follows:

1. The process for corrosion inhibition of ferrous metallic substances contacted by aqueous corrosive media which comprises contacting said substances with a corrosion inhibiting amount of the polyquaternary ammonium compound represented by the formula $$R[CH_2N^+(R')_3X^-]_n$$

in which R is the hydrocarbon radical of the polymeric fat acid $R[COOH]_n$ obtained by polymerization of an unsaturated higher fatty acid; R' is an aliphatic group of from 1 to 6 carbon atoms; X is a quaternary salt forming group selected from the class consisting of chloride, bromide, iodide, sulfates, and sulfonates and $n$ is from 2 to 3.

2. The process of claim 1, in which R' is a methyl group.

References Cited in the file of this patent
UNITED STATES PATENTS 2,901,430     Chaddix et al. _____ Aug. 25, 1959
2,913,305     Andersen _____ Nov. 17, 1959

OTHER REFERENCES

Duomeens, pub. by Armour and Co., page 2 relied on.